United States Patent [19]

St. Clair

[11] 4,247,137
[45] Jan. 27, 1981

[54] SOLDER FEEDER APPARATUS

[76] Inventor: Homer F. St. Clair, Levanna Rd., Aurora, N.Y. 13026

[21] Appl. No.: 54,899

[22] Filed: Jul. 5, 1979

[51] Int. Cl.³ .............................................. B23K 3/06
[52] U.S. Cl. .................................................. 228/52
[58] Field of Search ...................... 228/52, 53, 51, 41

[56] References Cited

U.S. PATENT DOCUMENTS 3,068,826  12/1962  Meader et al. ......................... 228/53
3,190,529  6/1965  Bellamy .................................. 228/53

Primary Examiner—Richard B. Lazarus
Attorney, Agent, or Firm—Charles S. McGuire

[57] ABSTRACT

An attachment for a soldering tool which allows selective feed of the solder wire to the heated tip with the same hand that holds the tool. A novel double-acting slide mechanism feeds the solder forwardly by pulling a trigger, or other actuating means, and retracts the end of the solder away from the tip on a portion of the return stroke of the slide mechanism.

8 Claims, 6 Drawing Figures

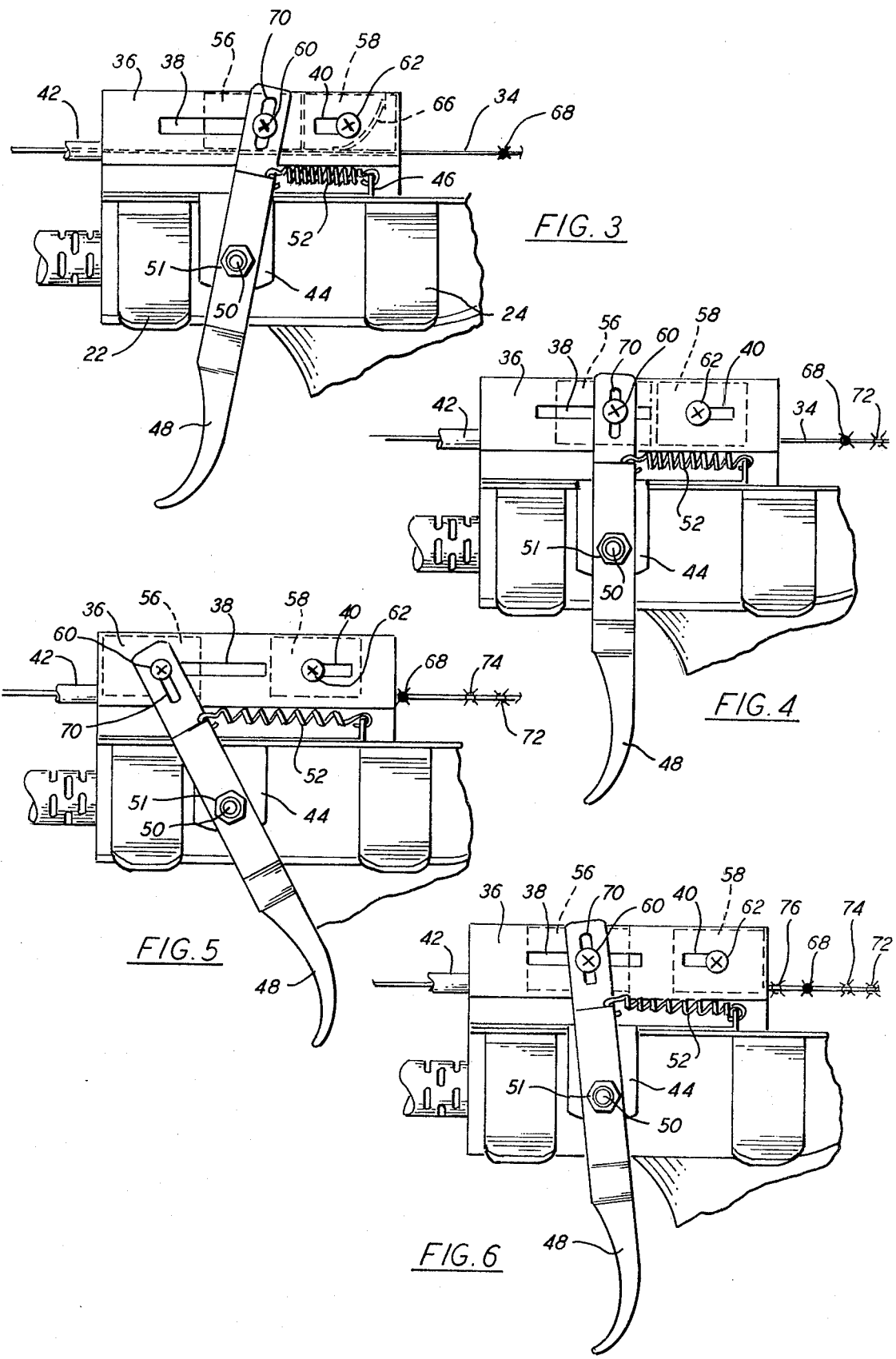

SOLDER FEEDER APPARATUS

BACKGROUND OF THE INVENTION

The present invention relates to apparatus for feeding solder from a supply spool to the heated tip of a soldering tool and, more specifically, to novel and improved mechanism for feeding a solder strip with the same hand that holds the tool and for retracting the end of the solder strip away from the tip upon completion of the soldering operation.

The desirability of using only one hand to hold a soldering tool and feeding a supply of solder thereto, freeing the other hand to hold the workpiece(s), has long been recognized. Many forms of apparatus have been proposed which effectively accomplish this purpose. Several such devices also include means for withdrawing the end of the solder from the area of the heated tip of the soldering tool to prevent unwanted melting of solder when the tool is not in use. Among such apparatus, for example, are those forms disclosed in U.S. Pat. Nos. 3,031,562, 3,190,529, 3,229,885 and 3,531,038.

It is a principal object of the present invention to provide a novel and improved soldering tool attachment which feeds a solder strip at a desired rate to the heated tip of the tool on the forward stroke of a slide mechanism and retracts and end of the strip away from the tip on a portion of the return stroke.

In a more general sense, the object of the invention is to provide improved manual solder feeding apparatus.

Other objects will in part be obvious and will in part appear hereinafter.

SUMMARY OF THE INVENTION

In accordance with the foregoing objects, the invention contemplates apparatus having means for carrying a spool of solder wire and a tubular guide through which the solder strip is led from the spool to the vicinity of the heated tip of a soldering tool upon which the apparatus is removably mounted. Between the spool and the tubular guide, the solder strip passes through two adjacent, one-way gripper means; that is, each of the gripper means positively engages the solder strip to prevent relative movement in one direction while allowing relative movement in the opposite direction.

The gripper means are reciprocally slideable along the path of movement of the solder strip in response to manual movement by the tool operator of a lever positioned for actuation by the index finger of the hand holding the soldering tool. Movement of the two gripper means is guided and limited in the forward, or solder feeding, and rearward, or solder retracting, directions by a slotted member. The extent of travel of the rear (i.e., closest to the spool) gripper means is limited by the slotted member to a fraction, e.g., about one-third of the maximum travel of the forward gripper.

The construction and arrangement of the two grippers is such that both can be moved only in the rearward direction relative to the solder strip. That is, either gripper may be moved rearwardly while the solder is stationary, or the solder may be moved forwardly as one of the grippers is held stationary. Due to this arrangement of the grippers and the differences in the extent of their travel, the solder is engaged and fed forwardly by both grippers in the first portion of travel; it continues to be engaged and drawn forwardly by the front gripper, being pulled through the rear gripper upon continued forward movement of the front gripper after the rear gripper has reached the maximum extent of its forward travel; upon string-biased return of the actuating lever, both grippers are moved rearwardly, drawing the solder with them to withdraw the end thereof from the area of the heated tip of the tool; when the rear gripper reaches the rearward extent of its travel, the solder is engaged and held stationary thereby as the forward gripper continues its rearward travel, riding over the stationary solder.

The foregoing details of construction and operation will be more fully understood from the following detailed description, taken in conjunction with the accompanying drawings, wherein:

BRIEF DESCRIPTION OF THE DRAWINGS

FIGS. 3–6 are a series of fragmentary, side elevational views showing various elements of the attachments in a succession of positions of relative movement.

DETAILED DESCRIPTION

Figure 1:
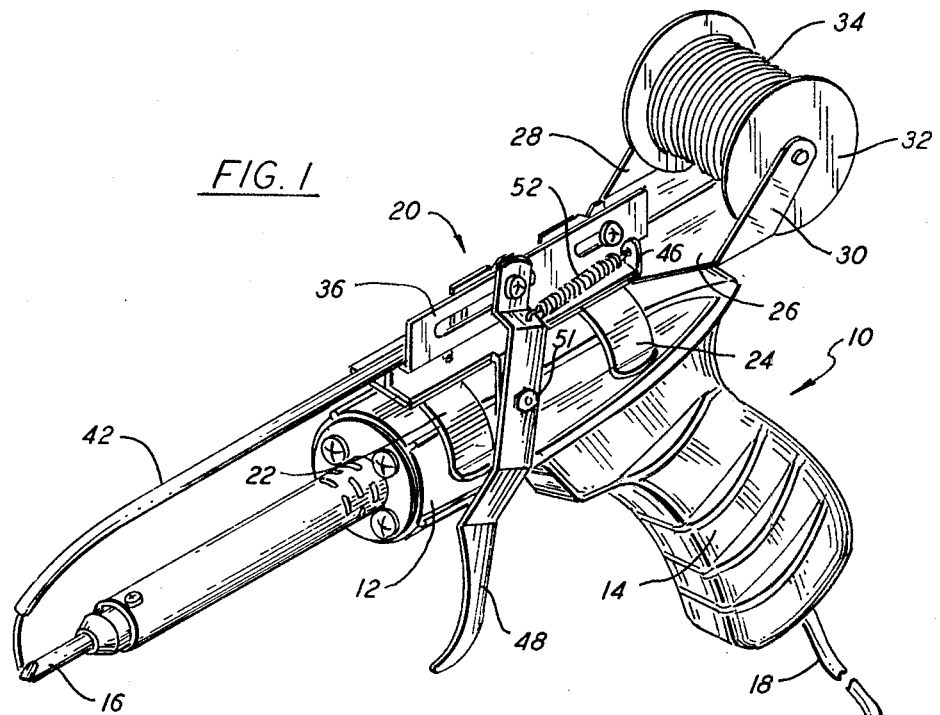
FIG. 1 is a perspective view of a conventional soldering tool with the attachment of the invention mounted thereon.

Referring now to the drawings, in FIG. 1 is shown a typical soldering tool 10 having body portion 12, handle 14 and tip 16, heated by electrical resistance with power supplied through cord 18. Tool 10 is conventional in all respects, although the attachment of the present invention may be mounted, either in the form shown or appropriately modified in dimensions and/or configuration of the mounting means, upon virtually any form of soldering gun or iron. The attachment is denoted generally by reference numeral 20, and in the illustrated embodiment, the mounting means comprise spring clips 22 and 24 which resiliently engage body portion 12 of tool 10.

Attachment 20 includes unitary body portion 26, to which mounting clips 22 and 24 are affixed. Arms 28 and 30 are formed integrally with body portion 26 and carry therebetween spool 32 having a continuous strip of solder 34 wound thereon. Bracket 36 is mounted upon body portion 26 and includes a pair of open slots 38 and 40. Hollow, tubular guide 42 is fixedly attached at one end to bracket 36 and extends to a position adjacent the end of heated tip 16. Bracket 36 includes a pair of integrally tabs 44 and 46. Lever 48 is pivotally mounted by threaded pin 50 upon tab 44, secured by nut 51, and is biased toward clockwise movement as shown in FIG. 1 by spring 52, attached at one end to tab 46 and at the other to lever 48.

Figure 2:
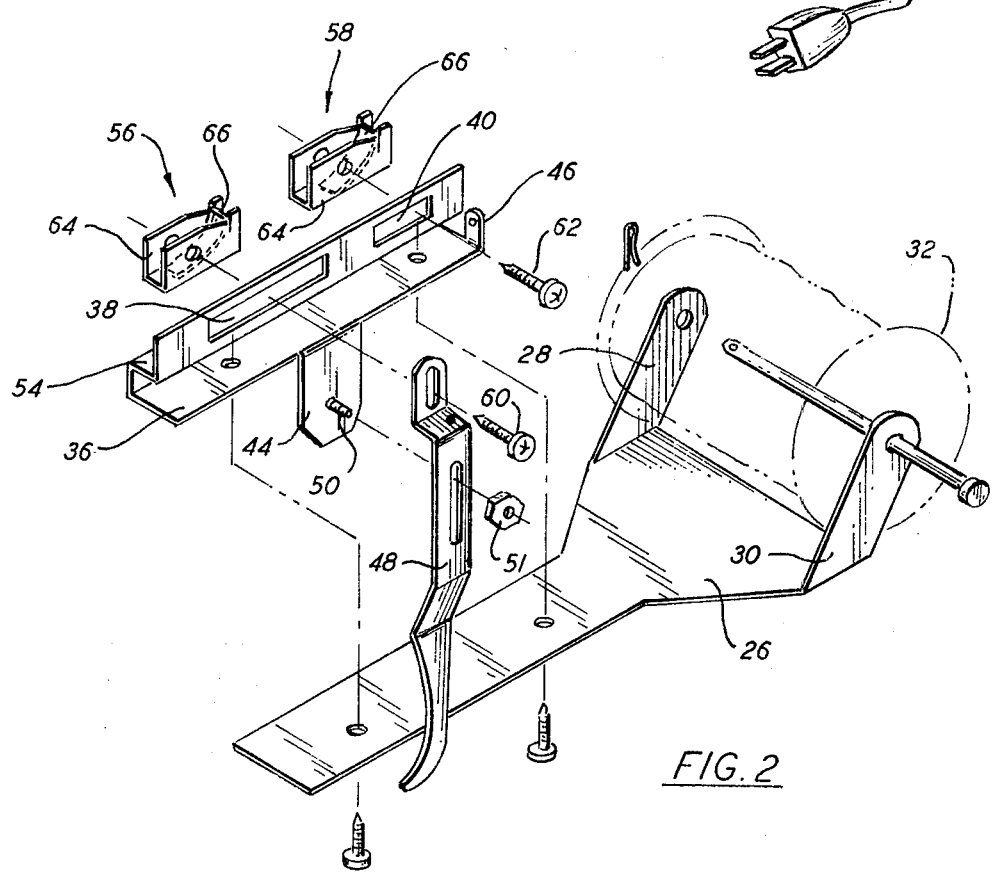
FIG. 2 is a fragmentary, exploded perspective view of portions of the attachment of FIG. 1.

The slotted portion of bracket 46 is disposed perpendicularly to body portion 26, the bracket further including a surface 54, a portion of which is seen in FIG. 2, parallel to the major plane of the body portion. Forward and rear gripper members 56 and 58, respectively, are mounted for reciprocal movement upon surface 54, being slidably affixed to bracket 46 by screws 60 and 62 which pass through slots 38 and 40, respectively, to engage threaded openings in the gripper members. Gripper members 56 and 58 are identical in construction, each including a generally U-shaped body portion 64 and a resiliently flexible member 66, in the nature of a leaf spring, having one end anchored to the gripper body and a free end biased toward engagement with the lower inside surface of the body portion. A solder wire may be moved forwardly under flexible members 66 as gripper members 56 and 58 are held stationary, but cannot be moved rearwardly through the gripper members because the free ends of the flexible members 66 tend to bite into the wire, forming a positive engagement or stop means.

Turning now to FIGS. 3-6, the sequence of movement of the various elements during operation of the device is shown more clearly. In the initial or rest position of FIG. 3, spring 52 holds lever 48 to the maximum limit of clockwise rotation as established by contact of screws 60 and 62 with the rear ends of slots 38 and 40, respectively. The initial position of a reference point on the solder to illustrate its movement is denoted in FIG. 3 by reference numeral 68.

As lever 48 is rotated by finger pressure on its lower end, gripper member 56 is moved forwardly due to the engagement of screw 60 with slot 70 in the upper end of lever 48. Movement of gripper member 56 in the forward direction moves solder wire 34 due to the positive engagement in this direction provided by the free end of flexible member 66. This is, the wire cannot remain stationary when the gripper member 56 is moved in the forward direction. Although the wire could move forwardly without moving gripper member 58 with it, the frictional engagement of the wire between flexible member 66 and the lower inside surface of gripper body 64 is sufficient to pull member 58 forwardly until screw 62 reaches the forward end of slot 40.

The elements are pictured in FIG. 4 with gripper member 58 at the limit of its forward movement. Reference point 68 has moved to the indicated position from its initial position, denoted in FIGS. 4-6 by numeral 72. Upon continued counter-clockwise rotation of lever 48, gripper member 56 and solder 34 are moved forwardly, but member 58 remains stationary as the wire is pulled in the forward direction under flexible member 66 thereof. FIG. 5 shows the elements with gripper member 56 at the limit of its forward movement and thus lever 48 at the maximum extent of its counterclockwise rotation. Reference point 68 has moved from point 74, where it was located in FIG. 4, to the position shown, indicating that an amount of solder equal to that between points 68 and 74 has been melted during this movement, assuming tip 16 to be heated.

As finger pressure is relieved on lever 48, spring 52 causes clockwise rotation thereof, moving gripper members 56 and 58 rearwardly from the FIG. 5 to the FIG. 6 position. Again, the frictional engagement of the wire under flexible members 66 will move the wire rearwardly together with the gripper members, as indicated by the FIG. 6 position of reference mark 68, which has moved from point 76 where it was located in FIG. 5. Thus, the end of the solder wire has been moved away from heated tip 16 by a distance equal to that between points 76 and 68, thereby preventing unwanted melting of the solder when the operation is finished.

Continued clockwise rotation of lever 48 by spring 52 will return the elements to their FIG. 3 positions. However, gripper members 58 will remain stationary since screw 62 has reached the rearward limit of its movement in the FIG. 6 position. Thus, wire 34 will also remain stationary since it cannot be pushed rearwardly through a stationary gripper member. Therefore, the wire remains in the FIG. 6 position as lever 48 and gripper member 56 continue their rearward movement to the FIG. 3 position, with flexible member 66 of gripper 56 sliding over the stationary wire.

Thus, the first increment of forward movement of the gripper members and wire, from the FIG. 3 to the FIG. 4 position, moves the end of the wire from its retracted position back into contact with heated tip 16. The next increment of forward movement, from FIG. 4 to FIG. 5, continues to feed the solder for melting by the tip. The first increment of rearward movement, from FIG. 5 to FIG. 6, moves the end of the solder away from the heated tip, and the final increment of rearward movement, from FIG. 6 to FIG. 3, simply returns lever 48 and gripper member 56 to their original positions.

What is claimed is:

1. An attachment for a soldering tool having a body portion to be held by an operator and a heated tip, said attachment comprising, in combination:
   (a) means for rotatably holding a spool holding a supply of solder in strip form;
   (b) guide means through which said solder strip is directed from said spool to a terminal end in the vicinity of said heated tip;
   (c) a pair of gripper means through which said solder strip passes intermediate of said spool and said guide means;
   (d) means for mounting both of said gripper means for reciprocating movement along the path of travel in a forward and rearward direction toward and away from said guide means, respectively, and for limiting the maximum extent of travel of one of said gripper means to a fraction of that of the other of said gripper means;
   (e) said gripper means each including engagement members preventing movement of said solder strip in said rearward direction relative to said gripper means and permitting movement of said solder strip in said forward direction relative to said gripper means;
   (f) manual actuating means for movement by the same hand of said operator which holds said tool body portion;
   (g) means coupling said actuating means to said other gripper means for moving the latter in said forward direction in response to operator movement of said actuating means, thereby moving said solder strip and said one gripper means in said forward direction and bringing said terminal end of said solder strip into contact with said heated tip, said solder strip being drawn in the forward direction through said one gripper when the latter reaches the maximum extent of its forward movement as said terminal end of said solder strip is melted by said heated tip; and
   (h) return means for moving said pair of gripper means in said rearward direction upon release of said actuating means, thereby moving said solder strip in said rearward direction and moving said terminal end thereof away from contact with said heated tip, said other gripper means continuing to move rearwardly after said one gripper means reaches the maximum extent of its rearward travel and holds said solder strip stationary.

2. The invention according to claim 1 wherein said fraction is approximately one-third.

3. The invention according to claim 1 wherein said actuating means comprises a pivotally mounted lever.

4. The invention according to claim 3 wherein said return means comprises a spring anchored at one end and attached at the other end to said lever.

5. The invention according to claim 1 wherein said engagement members each comprise a leaf spring member having an anchored end and a free end, and said gripper means further include a support underlying said free end with the latter resiliently biased toward engagement with said support.

6. The invention according to claim 1 wherein said mounting means includes a pair of slots elongated in the direction of travel of said gripper means and each of said gripper members carries a fixed element extending through one of said slots, whereby the maximum extent of travel of said gripper means is limited by the length of the respective slots.

7. The invention according to claim 6 wherein the length of one of said slots is approximately one-third that of the other.

8. The invention according to claim 1 wherein said guide means comprises a hollow tube having one end affixed to said mounting means and the other end directed toward said heated tip for guiding said solder strip into contact therewith.

* * * * *